United States Patent
Obermeyer et al.

(10) Patent No.: US 12,030,386 B2
(45) Date of Patent: Jul. 9, 2024

(54) WHEEL DRIVE MODULE WITH A WHEEL RECEIVED IN THE WHEEL DRIVE MODULE

(71) Applicant: ebm-papst St. Georgen GmbH & Co. KG, St. Georgen (DE)

(72) Inventors: Friedrich Obermeyer, Forchheim (DE); Joerg Hornberger, Dornstetten-Aach (DE); Andreas Riedel, Roethenbach (DE); Richard Silberhorn, Wendelstein (DE)

(73) Assignee: ebm-papst St. Georgen GmbH & Co. KG, St. Georgen (DE)

( * ) Notice: Subject to any disclaimer, the term of this patent is extended or adjusted under 35 U.S.C. 154(b) by 851 days.

(21) Appl. No.: 17/253,563

(22) PCT Filed: May 23, 2019

(86) PCT No.: PCT/EP2019/063378
§ 371 (c)(1),
(2) Date: Dec. 17, 2020

(87) PCT Pub. No.: WO2019/242980
PCT Pub. Date: Dec. 26, 2019

(65) Prior Publication Data
US 2021/0162857 A1   Jun. 3, 2021

(30) Foreign Application Priority Data
Jun. 22, 2018  (DE) .................. 10 2018 115 117.9

(51) Int. Cl.
*B60K 7/00*   (2006.01)
*B60K 17/04*  (2006.01)
(Continued)

(52) U.S. Cl.
CPC .......... *B60K 7/0007* (2013.01); *B60K 17/043* (2013.01); *B62D 5/0418* (2013.01);
(Continued)

(58) Field of Classification Search
CPC .. B60K 7/0007; B60K 17/043; B62D 5/0418; B62D 7/02
See application file for complete search history.

(56) References Cited

U.S. PATENT DOCUMENTS

2013/0333966 A1* 12/2013 Bryant .................. B60K 17/30
   180/65.51
2022/0379716 A1* 12/2022 Yan ..................... B60W 60/001

FOREIGN PATENT DOCUMENTS

CN  111874088 A  * 11/2020  .......... B62D 5/0418
CN  213056668 U  *  4/2021
(Continued)

OTHER PUBLICATIONS

International Search Report dated Sep. 6, 2019, which issued in corresponding PCT Patent Application No. PCT/EP2019/063378, including Eng. translation.

*Primary Examiner* — Katy M Ebner
(74) *Attorney, Agent, or Firm* — Dickinson Wright PLLC

(57) ABSTRACT

A wheel drive module (1) is provided that has a wheel (30) and a transmission, wherein the transmission comprises a first and a second drive gear ring (15, 25) which are arranged such that they can rotate about a common rotation axis (R). The wheel (30) can be steered and driven by a respective rotation of the first drive gear ring (15) and the second drive gear ring (25). A wheel-receiving space (20) extending along the axis of rotation (R) is defined between the first drive gear ring (15) and the second drive gear ring (25), in which the wheel (30) is arranged at least sectionally.

10 Claims, 2 Drawing Sheets

(51) Int. Cl.
    *B62D 5/04*          (2006.01)
    *B62D 7/02*          (2006.01)
    *F16H 57/031*       (2012.01)
    *F16H 1/22*           (2006.01)
    *F16H 57/02*         (2012.01)

(52) U.S. Cl.
    CPC ............ *B62D 7/02* (2013.01); *F16H 57/031* (2013.01); *B60K 2007/003* (2013.01); *B60K 2007/0084* (2013.01); *F16H 1/222* (2013.01); *F16H 2057/02034* (2013.01); *F16H 2057/02043* (2013.01)

(56) References Cited

FOREIGN PATENT DOCUMENTS

| | | |
|---|---|---|
| DE | 20 2008 004190 U1 | 6/2008 |
| DE | 10 2016 007445 A1 | 12/2017 |
| JP | 3 407430 B2 | 5/2003 |
| JP | 3407430 B2 * | 5/2003 |

\* cited by examiner

WHEEL DRIVE MODULE WITH A WHEEL RECEIVED IN THE WHEEL DRIVE MODULE

BACKGROUND

Field

The invention relates to a wheel drive module comprising a wheel received at least sectionally in the wheel drive module.

Description of Related Art

In the prior art, a plurality of wheel drive modules and wheel drive designs for the different application fields are already known. If the wheel drive designs are to be bundled to form a single module, it is advantageous if said module is of compact design and consequently has only a low space requirement. In particular in the case of the use of such a wheel drive module for logistic applications, for example, in the case of transport carriages, a low installation space requirement and improved steerability are advantageous. In the designs disclosed in the prior art, a wheel is usually rotated about a steering axis and thereby steered. A transmission for transmitting a rotation of a motor to the wheel is usually arranged offset and spaced apart from the wheel, which leads to a high installation space requirement. In addition, in the designs known from the prior art, the wheel has a limited steering angle and during a steering movement, for example, it cannot be rotated or turned by more than 360°. As a result, the space requirement in the prior art is usually too high and the possible steering angles or rotation angles about the steering axis are limited.

SUMMARY

The underlying aim of the invention therefore is to overcome the aforementioned disadvantages and to provide a wheel drive module which has an increased steering angle of the wheel as well as a low installation space requirement and which can be produced as a compact and cost-effective modular unit.

This aim is achieved by a combination of features in accordance with an embodiment of the present disclosure such as a wheel drive module (1) comprising a wheel (30) and a transmission, wherein the transmission comprises a first and a second drive gear ring (15, 25), which are arranged such that they can rotate about a common rotation axis (R), the wheel (30) can be steered and driven by a respective rotation of the first drive gear ring (15) and the second drive gear ring (25), and a wheel-receiving space (20) extending along the axis of rotation (R) is defined between the first drive gear ring (15) and the second drive gear ring (25), in which the wheel (30) is arranged at least sectionally.

In accordance with an embodiment of the present disclosure, rgw wheel drive module further comprises an output shaft (31) connected to the wheel (30), with a driven gearwheel (32), which can be rotated about a wheel axis (A) extending orthogonally to the rotation axis (R) and which can be driven by the first and the second drive gear rings (15, 25).

In accordance with an embodiment of the present disclosure, the wheel (30) can be steered by a first rotation of the first drive gear ring (15) and a second rotation of the second drive gear ring (25) about the rotation axis (R) of the first and second drive gear rings (15, 25) and can be driven about the wheel axis (A) via a third rotation transmitted by the first and second rotations to the output shaft (31).

In accordance with an embodiment of the present disclosure, the wheel drive module, further comprises an intermediate shaft (34) which extends along an intermediate axis (Z), a driving intermediate wheel (33) and a driven intermediate wheel (35), which are arranged along the intermediate axis (Z) of mutually opposite sides of the intermediate shaft (34) and are connected to the intermediate shaft (34). The driving intermediate wheel (33) engages in the first and second drive gear rings (15, 25). The driven intermediate wheel (35) engages in the driven gearwheel (32) and can be driven via the intermediate axis (34) of the wheel (30) about the wheel axis (A).

In accordance with an embodiment of the present disclosure, the first drive gear ring (15) and/or the second drive gear ring (25) comprise/comprises an axially central ring opening (15', 25') which extends in each case along a rotation axis (R) of the first drive gear ring (15) and/or of the second drive gear ring (25) through the first drive gear ring (15) and/or the second drive gear ring (25) and widens the wheel-receiving space (20) along the rotation axis (R).

In accordance with an embodiment of the present disclosure, the wheel (30) extends through the ring opening (15') of the first drive gear ring (15) and/or the ring opening (25') of the second drive gear ring (25) and along the rotation axis (R) beyond the first drive gear ring (15) and/or the second drive gear ring (25).

In accordance with an embodiment of the present disclosure, the ring opening (15') of the first drive gear ring (15) and/or the ring opening (25') of the second drive gear ring (25) are/is formed concentrically to the rotation axis (R).

In accordance with an embodiment of the present disclosure, wheel drive module further comprises a cover plate (16) which is arranged on the first drive gear ring (15) or the second drive gear ring (25) and covers the respective ring opening (15', 25').

In accordance with an embodiment of the present disclosure, the wheel drive module further comprises a protective plate (26) which is arranged on the first drive gear ring (15) or the second drive gear ring (25). The protective plate is received so that it can rotate about the rotation axis (R) independently of the first drive gear ring (15) and the second drive gear ring (25) and can rotate with the wheel (30) and comprises a protective plate opening (26') through which the wheel (30) extends.

BRIEF DESCRIPTION OF THE DRAWINGS

Other advantageous developments of example embodiments of the invention are characterized in the dependent claims or represented in further detail below together with the description of the preferred embodiment of the invention in reference to the figures. The figures show:

The figures are diagrammatic examples. Identical reference numerals in the figures refer to functionally and/or structurally identical features.

DETAILED DESCRIPTION OF THE ILLUSTRATIVE EMBODIMENTS

Figure 1:
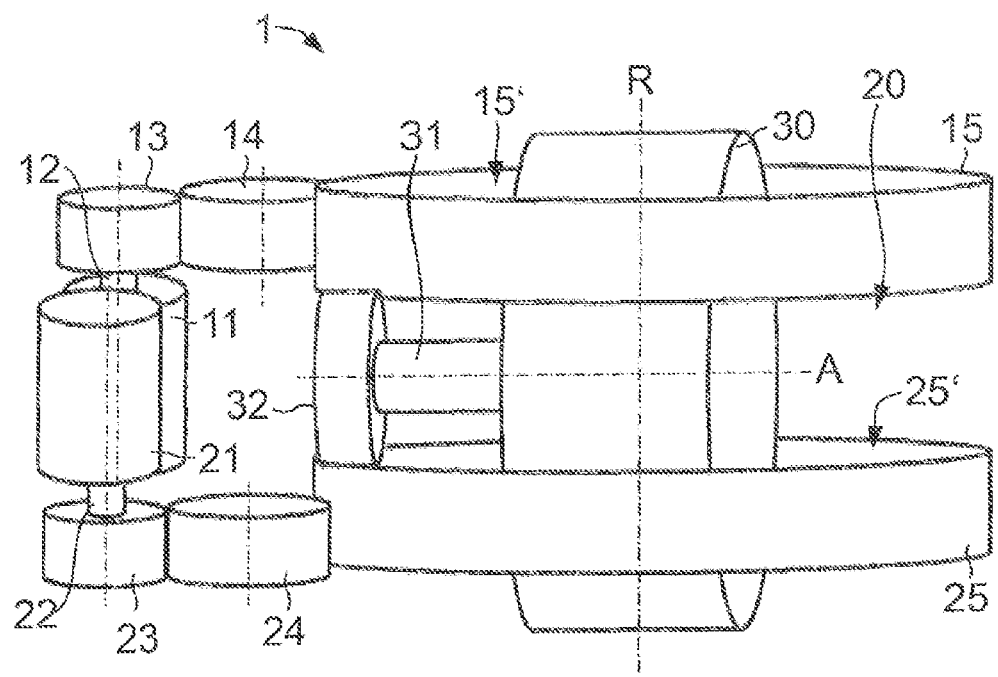
FIG. 1 a perspective representation of a wheel drive module with the drive motors driving the drive gear rings.

According to an example embodiment of the invention, a wheel drive module with a wheel and a transmission is proposed. The transmission of the wheel drive module comprises a first and a second drive gear ring. The drive gear rings can be rotated about a common rotation axis and are arranged spaced apart from one another along the rotation axis, wherein they can rotate independently of one another about their rotation axis and for this purpose are driven, for example, by a respective drive motor. The wheel can be steered and driven by a respective rotation of the first drive gear ring and of the second drive gear ring. Furthermore, to save installation space and to widen the steering angle between the first drive gear ring and the second drive gear ring, a wheel-receiving space is defined, which extends along the rotation axis and is, in particular, cylindrical, in which the wheel is at least sectionally arranged. In addition, the wheel is preferably arranged with its width extent orthogonal to the rotation axis centered on the rotation axis.

The first and the second drive gear rings are preferably each formed as a crown gear which comprises a first toothing facing the driven gearwheel and engaging in the driven gearwheel, and a second driving toothing via which the respective crown gear can be driven.

An advantageous embodiment provides that the wheel drive module additionally comprises an output shaft with a driven gearwheel fastened thereon. For transmitting the rotations of the first and second drive gear rings to the wheel, the output shaft is connected in a rotationally fixed manner to the wheel and comprises the driven gearwheel on a side spaced apart from the wheel in longitudinal direction of the output shaft, said driven gearwheel being also fastened in a rotationally fixed manner on the output shaft. The modular unit consisting of the output shaft with the wheel and the driven gearwheel is mounted so that it can rotate about a wheel axis extending orthogonally to the rotation axis and can be driven by the first and the second driving gear rings. The rotation of the modular unit consisting of output shaft with the wheel and the driven gearwheel about the rotation axis of the drive gear rings leads to a rotation of the wheel about the rotation axis and thus to a steering movement of the wheel about the rotation axis, wherein the rotation axis of the drive gear rings is used as steering axis.

A first rotation transmitted by the first drive gear ring to the driven gearwheel and/or a second rotation transmitted by the second drive gear ring to the driven gearwheel moves the driven gearwheel in a third rotation about the wheel axis, wherein the wheel is set in rotation via the output shaft about the wheel axis and thereby driven. Furthermore, as a result of a first rotation of the first drive gear ring and a second rotation of the second drive gear ring about the rotation axis of the first and second drive gear rings, a rotation of the modular unit consisting of the driven gearwheel, the output shaft and the wheel about the rotation axis and thus the steering movement can also occur, so that the wheel can be steered by the rotation of the first and second drive gear rings.

If the first drive gear ring and the second drive gear ring rotate about their common rotation axis with the same rotational speed in opposite directions, the driven gearwheel is rotated about the wheel axis without rotation or turning of the driven gearwheel, of the output shaft or of the wheel about the rotation axis of the drive gear rings occurring. As a result of the mutually opposite and equal-amount rotations of the drive gear rings, a driving of the wheel without steering movement is implemented.

If the first drive gear ring and the second drive gear ring rotate about their rotation axis with the same rotational speed in an identical direction, the driven gearwheel is not rotated about the wheel axis and is rotated exclusively about the rotation axis of the driving gear rings, so that a steering movement of the wheel without driving of the wheel about the wheel axis occurs.

If the first drive gear ring and the second drive gear ring rotate about their rotation axis with different rotational speed in opposite or identical directions about their rotation axis, or if a drive gear ring does not move, a steering movement about the rotation axis of the drive gear rings and a driving about the wheel axis simultaneously occur on the wheel.

An alternative and also advantageous development of the wheel drive module provides that the drive gear rings do not drive the output shaft directly via the driven gearwheel but instead drive it indirectly via an intermediate shaft which is offset with respect to the output shaft along the rotation axis of the drive gear rings. For this purpose, the wheel drive module additionally comprises an intermediate shaft, a driving intermediate wheel and a driven intermediate wheel. The intermediate shaft extends along an intermediate axis, about which the intermediate shaft with the driving and driven intermediate wheels is rotatably mounted. The driving intermediate wheel and the driven intermediate wheel are arranged along the intermediate axis on mutually opposite sides of the intermediate shaft and are connected at least in a rotationally fixed manner to it. Furthermore, the driving and the driven intermediate wheels are each designed as a gearwheel, wherein the driving intermediate wheel engages in the first and second driving gear rings and the driven intermediate wheel engages in the driven gearwheel. The first and second rotations of the drive gear rings can be transmitted as a rotation of the intermediate shaft via the intermediate shaft to the output shaft, and the wheel can be driven about the wheel axis. The rotation of the intermediate shaft here generates the third rotation of the output shaft. By the gearwheel pairing consisting of driven gearwheel and driven intermediate wheel, a transmission between intermediate shaft and output shaft can be additionally implemented. The intermediate shaft and the output shaft are fixed in terms of their relative position with respect to the rotation axis of the drive gear rings, as a result of which a rotation of the intermediate shaft about the rotation axis leads to a rotation of the output shaft about the rotation axis, and a steering movement of the wheel about the rotation axis is carried out. The intermediate axis and the wheel axis are preferably parallel to one another. Furthermore, due to the offset with respect to the intermediate axis, the wheel axis preferably extends outside of the intermediate space between the drive gear rings.

In an advantageous variant of the wheel drive module, the first drive gear ring and/or the second drive gear ring comprise/comprises an axially central ring opening which in each case extends along the common rotation axis of the first drive gear ring and of the second drive gear ring through the respective or the first drive gear ring and/or the second drive gear ring. The ring opening widens or the ring openings widen the wheel-receiving space along the rotation axis.

If the wheel drive module or at least one of the drive gear rings comprises such a ring opening, an advantageous embodiment variant provides that the wheel extends through the ring opening of the first drive gear ring and/or the ring opening of the second drive gear ring and extends along the rotation axis beyond the first drive gear ring and/or the second drive gear ring.

The ring opening of the first drive gear ring and/or the ring opening of the second drive gear ring are/is preferably designed concentrically to the rotation axis.

Furthermore, an advantageous development provides that the wheel drive module comprises a cover plate which is arranged on the first drive gear ring or the second drive gear ring, and covers or closes the respective ring opening. If the wheel extends through the ring opening of the two drive gear rings, it is in contact on one side with the ground or with a running surface. On the opposite side of the wheel, said wheel protrudes beyond the drive gear ring of this side. On the side on which the wheel is not in contact with the ground, the wheel can be covered by the cover plate, so that, for example, dirt cannot penetrate into the wheel-receiving space. Alternatively, the cover plate is not connected to one of the drive gear rings but instead is mounted on the output shaft, so that, for example, forces acting on to the wheel through the ground can be supported via the output shaft and the cover plate.

In order to minimize or prevent the penetration of dirt into the wheel-receiving space through a ring opening on the side of the ground, an advantageous embodiment furthermore provides that the wheel drive module comprises a protective plate which is arranged on the first drive gear ring or the second drive gear ring facing the ground. The protective plate is arranged so that it can rotate together with the wheel about the rotation axis and is received so that it can rotate independently of the first and second drive gear rings. In addition, the protective plate comprises a preferably slot-shaped protective plate opening through which the wheel extends.

In FIG. 1, the wheel drive module 1 together with the drive motors 11, 21 which drive the first and the second drive gear rings 15, 25 is represented. The first drive motor 11 is arranged opposite the second drive motor 21, wherein the drive motors 11, 21 can each comprise a separate motor transmission. Via a respective motor shaft 12, 22, the drive motors 11, 21 are each connected to a pinion 13, 23.

The first pinion 13 engages its toothing in a toothing of a first intermediate wheel 14 which engages by means of its toothing in a drive toothing of the first drive gear ring 15, so that, by a rotation of the first pinion 13, the first drive gear ring 15, driven by the first drive motor 11, can be rotated about the rotation axis R.

Analogously, the same applies to the second drive gear ring 25. The second pinion 23 engages by means of its toothing in a toothing of a second intermediate wheel 24, which, by means of its toothing, engages in a drive toothing of the second drive gear ring 25, whereby, by a rotation of the second pinion 23, the second drive gear ring 25, driven by the second drive motor 21, can be rotated about the rotation axis R.

Between the first and the second drive gear rings 15, 25, a driven gearwheel 32 is arranged, which engages by means of its toothing both in a toothing of the first drive gear ring 15 facing the driven gearwheel 32 and also in a toothing of the second drive gear ring 25 facing the driven gearwheel 32. The rotation of the driven gearwheel 32 (third rotation) is consequently brought about both by the rotation of the first drive gear ring 15 (first rotation) and also by the rotation of the second drive gear ring 25 (second rotation).

From the driven gearwheel 32, an output shaft 31 connected in a rotationally fixed manner to the driven gearwheel 32 extends along a wheel axis A in the direction of the rotation axis R of the drive gear rings 15, 25. The wheel 30 is connected in a rotationally fixed manner to the output shaft 31 on a side spaced apart from the driven gearwheel 32 along the wheel axis A, whereby a rotation (third rotation) of the driven gearwheel 32 is transmitted via the output shaft 31 to the wheel 30. The wheel 30, as represented, is received sectionally between the first drive gear ring 15 and the second drive gear ring 25, which are spaced apart along their rotation axis R and define a wheel-receiving space 20 between them. The two drive gear rings 15, 25 comprise a ring opening 15', 25' extending through the respective drive gear ring 15, 25 along the rotation axis R. The wheel 30 extends at least on its side facing the ground B through the respective ring opening 15', 25', whereby the wheel 30 comprises substantially five sections. A first section where the wheel 30 is arranged between the drive gear rings, two second sections where the wheel 30 is arranged in the ring openings 15', 25' of the drive gear rings 15, 25, and two third sections where the wheel 30 is lies along the rotation axis R outside of the drive gear rings 15, 25. The arrangement of the wheel 30 in the wheel-receiving space 20 leads to three advantageous effects. The installation space of the wheel drive module is clearly reduced, since the wheel 30, during a steering movement, does not have to run around the drive gear rings 15, 25, and the possible steering angle is widened, since the wheel 30 can rotate by 360° in the drive gear rings 15, 25 without the steering movement or rotation about the rotation axis R being limited by the intermediate wheels 14, 24. In addition, the wheel 30 is protected by the wheel drive module 1 or by the first and second drive gear rings 15, 25, since they form a cage around the wheel 30.

Figure 2:
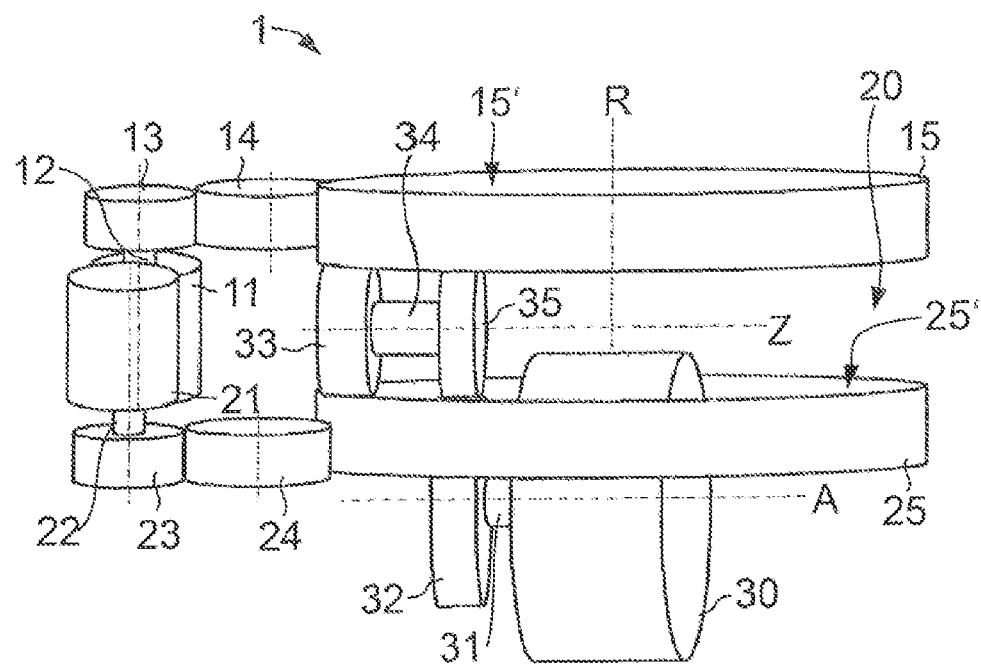
FIG. 2 a perspective representation of a wheel drive module with intermediate shaft.

In comparison to the wheel drive module 1 of FIG. 1, the embodiment variant of the wheel drive module 1 represented in FIG. 2 additionally comprises an intermediate shaft 34, a driving intermediate wheel 33 and a driven intermediate wheel 35. The intermediate shaft 34 extends along an intermediate axis Z and can be rotated about it. On a first side, along the intermediate axis Z, the driving intermediate wheel 33, and on an opposite second side, along the intermediate axis Z, the driven intermediate wheel 35 are fastened or connected to the intermediate shaft 34. The driving intermediate wheel 33 is designed as a gearwheel and engages in the first and second drive gear rings 15, 25, whereby the intermediate shaft 34 with the driving intermediate wheel 33 and with the driven intermediate wheel 35 can be rotated via the driving intermediate wheel 33 about the intermediate axis Z by the first and second rotations of the drive gear rings 15, 25. The driven intermediate wheel 35 is also designed as gearwheel and engages by means of its toothing in the toothing of the driven gearwheel 32. The rotation of the intermediate axis Z is transmitted via the driven intermediate wheel 35 to the driven gearwheel 32, to the output shaft 31 and to the wheel 30, whereby the wheel 30 can be driven about the wheel axis A. The intermediate axis Z and the wheel axis A are offset or spaced apart from one another along the rotation axis R and, in the present embodiment example, parallel to one another. The ground clearance is thus increased without an increase of the wheel diameter of the wheel 30 and at the same time the design height is furthermore reduced, since a section of the wheel 30 remains arranged between the drive gear rings 15, 25.

Figure 3:
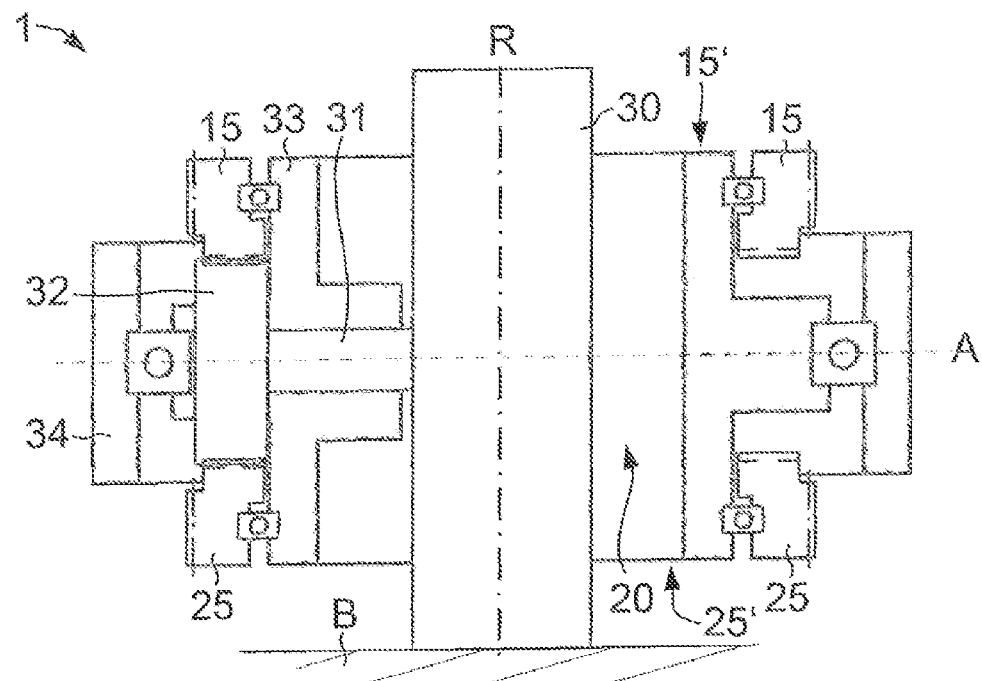
FIG. 3 a cross-sectional representation of a first wheel drive module.

The wheel drive module 1 represented in FIG. 3 is depicted in a partial section cut along the rotation axis R. In FIG. 3, the wheel 30 or the output shaft 31 is driven, as in the wheel drive module 1 shown in FIG. 1, via the driven gearwheel 32 directly by the first and second drive gear rings 15, 25 and comprises no intermediate shaft 34. The output shaft 31 with the driven gearwheel 32 and with the wheel 30 is held on an inner ring 33 which extends along the rotation axis R in the form of a tube through the wheel-receiving space 20. The inner ring 33 is supported on an outer ring 34 via an outer bearing ring which can be implemented in particular as ball bearings. On the inner ring 33, the first drive gear ring 15 and the second drive gear ring 25 are mounted in each case via an additional inner bearing ring.

Figure 4:
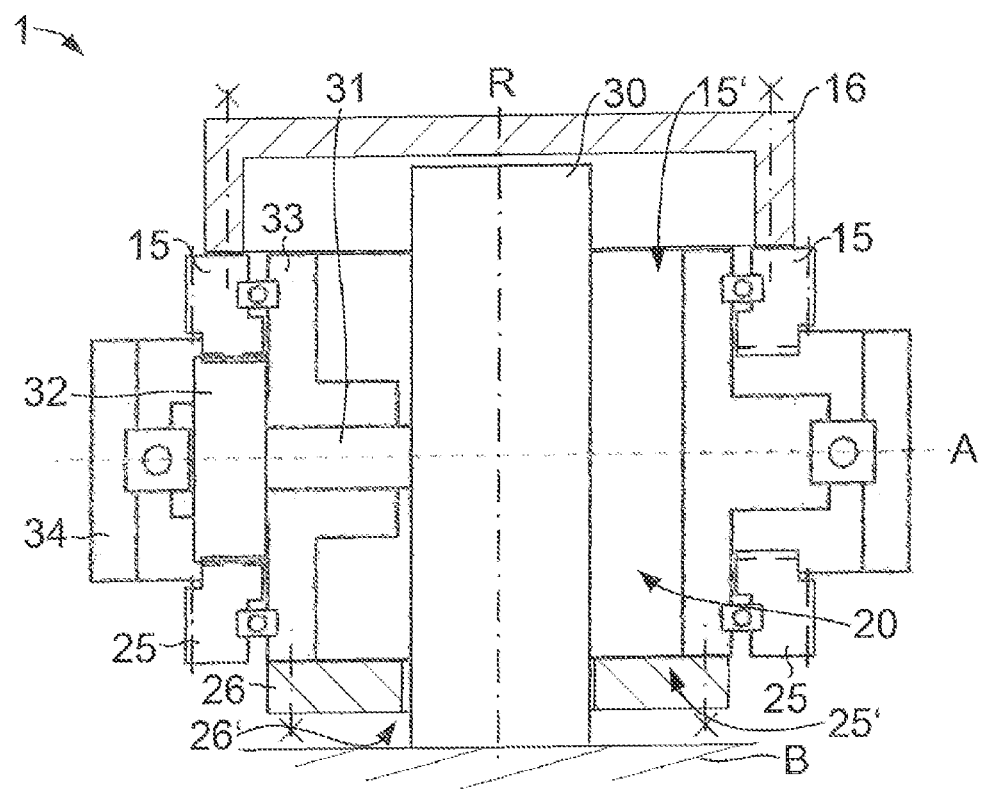
FIG. 4 a cross-sectional representation of a second wheel drive module.

Unlike the embodiment as represented in FIG. 3, the wheel drive module 1 in FIG. 4 comprises a cover plate 16 and protective plate 26.

The cover plate 16 is connected to the first drive gear ring 15 by means of diagrammatically indicated screws and can be rotated with it. The cover plate closes the wheel-receiving space 20 on the side of the wheel drive module 1 facing away from ground B, as a result of which no dirt or foreign bodies can penetrate from the side facing away from the ground B into the wheel drive module 1 or into the wheel-receiving space 20. In addition, no dirt accumulating on the wheel 30, or introduced from the side of the wheel-receiving space 20 facing the ground B, can penetrate into the assemblies arranged on the side of the wheel drive module 1 facing away from ground B. In an alternative embodiment, not shown, the cover plate 16 can also be fastened on the inner ring 33, whereby it can be rotated with the wheel 30 about the rotation axis R. If the cover plate 16 is fastened on the inner ring 33, a force acting on the wheel 30 can moreover be supported via the cover plate 16.

The protective cover plate 16 which is arranged on the side of the wheel drive module 1 facing the ground B, comprises a slot-like protective plate opening 26', through which the wheel 30 extends from the wheel-receiving space 20 to the ground B. Furthermore, protective plate 16 is screwed on the inner ring 33 and can be rotated with it about the rotation axis R. By means of the protective plate 16, the opening of the wheel drive module 1 or of the wheel-receiving space 20 facing the ground B can be nearly closed, so that substantially no dirt can penetrate into the wheel-receiving space.

The invention claimed is:

1. A wheel drive module (1) comprising a wheel (30) and a transmission, wherein
   the transmission comprises a first and a second drive gear ring (15, 25), which are arranged such that they can rotate about a common rotation axis (R),
   the wheel (30) can be steered and driven by a respective rotation of the first drive gear ring (15) and the second drive gear ring (25), and
   a wheel-receiving space (20) extending along the axis of rotation (R) is defined between the first drive gear ring (15) and the second drive gear ring (25), in which the wheel (30) is arranged at least sectionally,
   wherein the wheel drive module comprises
   an output shaft (31) connected to the wheel (30), with a driven gearwheel (32), which can be rotated about a wheel axis (A) extending orthogonally to the rotation axis (R) and which can be driven by the first and the second drive gear rings (15, 25), and
   an intermediate shaft (34) which extends along an intermediate axis (Z) different from the wheel axis (A), a driving intermediate wheel (33) and a driven intermediate wheel (35), which are arranged along the intermediate axis (Z) of mutually opposite sides of the intermediate shaft (34) and are connected to the intermediate shaft (34), wherein the driving intermediate wheel (33) engages in the first and second drive gear rings (15, 25), and the driven intermediate wheel (35) engages in the driven gearwheel (32) and can be driven via the intermediate axis (34) of the wheel (30) about the wheel axis (A).

2. The wheel drive module according to claim 1, wherein the wheel (30) can be steered by a first rotation of the first drive gear ring (15) and a second rotation of the second drive gear ring (25) about the rotation axis (R) of the first and second drive gear rings (15, 25) and can be driven about the wheel axis (A) via a third rotation transmitted by the first and second rotations to the output shaft (31).

3. The wheel drive module according to claim 1, wherein the first drive gear ring (15) and/or the second drive gear ring (25) comprise/comprises an axially central ring opening (15', 25') which extends in each case along a rotation axis (R) of the first drive gear ring (15) and/or of the second drive gear ring (25) through the first drive gear ring (15) and/or the second drive gear ring (25) and increases the wheel-receiving space (20) along the rotation axis (R).

4. The wheel drive module according to claim 3, wherein the wheel (30) extends through the ring opening (15') of the first drive gear ring (15) and/or the ring opening (25') of the second drive gear ring (25) and along the rotation axis (R) beyond the first drive gear ring (15) and/or the second drive gear ring (25).

5. The wheel drive module according to claim 3, wherein the ring opening (15') of the first drive gear ring (15) and/or the ring opening (25') of the second drive gear ring (25) are/is formed concentrically to the rotation axis (R).

6. The wheel drive module according to claim 1,
   further comprising a cover plate (16) which is arranged on the first drive gear ring (15) or the second drive gear ring (25) and
   covers the respective ring opening (15', 25').

7. The wheel drive module according to claim 1,
   further comprising a protective plate (26) which is arranged on the first drive gear ring (15) or the second drive gear ring (25), wherein
   the protective plate is received so that it can rotate about the rotation axis (R) independently of the first drive gear ring (15) and the second drive gear ring (25) and can rotate with the wheel (30) and comprises a protective plate opening (26') through which the wheel (30) extends.

8. The wheel drive module according to claim 1, wherein the intermediate axis (Z) and the wheel axis (A) are offset or spaced apart from one another along the rotation axis (R).

9. The wheel drive module according to claim 8, wherein the intermediate axis (Z) and the wheel axis (A) are parallel.

10. The wheel drive module according to claim 1, wherein the wheel axis (A) extends outside of the wheel-receiving space (20).

* * * * *